United States Patent [19]

Marchisseau et al.

[11] Patent Number: 5,810,969
[45] Date of Patent: Sep. 22, 1998

[54] METHOD FOR FIXING FRICTION LININGS BY MEANS OF ADHESION TO A SUPPORT DISC

[75] Inventors: Michel Marchisseau, Limoges; Jean-Claude Verdure, Ambazac, both of France

[73] Assignee: Valeo, Paris, Cedex, France

[21] Appl. No.: 772,496

[22] Filed: Dec. 23, 1996

[30] Foreign Application Priority Data

Dec. 27, 1995 [FR] France .................................. 95 15520

[51] Int. Cl.⁶ .................................................. B32B 31/00
[52] U.S. Cl. ................................................................ 156/580
[58] Field of Search ............................ 156/580, 583.1, 156/245

[56] References Cited

U.S. PATENT DOCUMENTS

| 3,710,071 | 1/1973 | Volker et al. ............................ 219/93 |
|---|---|---|
| 3,798,403 | 3/1974 | Mitchell et al. ......................... 219/633 |
| 4,900,240 | 2/1990 | Leinweber ............................... 425/110 |
| 5,091,041 | 2/1992 | Genise .................................. 156/583.1 |

FOREIGN PATENT DOCUMENTS 0 386 652  12/1990  European Pat. Off. .

OTHER PUBLICATIONS

Patent Abstracts of Japan, vol. 018, No. 341 (M–1629) & JP 06 081868A (Toyota Motor).

French Search Report dated 27 Sep. 1996.

*Primary Examiner*—Francis J. Lorin
*Attorney, Agent, or Firm*—Morgan & Finnegan, L.L.P.

[57] ABSTRACT

A method for fixing friction linings by means of adhesion to a support disc, in which, after the glue has been applied, the disc (16) and the linings (131, 132) are put under pressure, and the linings are heated using second heating means (31, 32) and the disc is heated using first heating means (51, 52), the disc (16) being heated more rapidly.

14 Claims, 3 Drawing Sheets

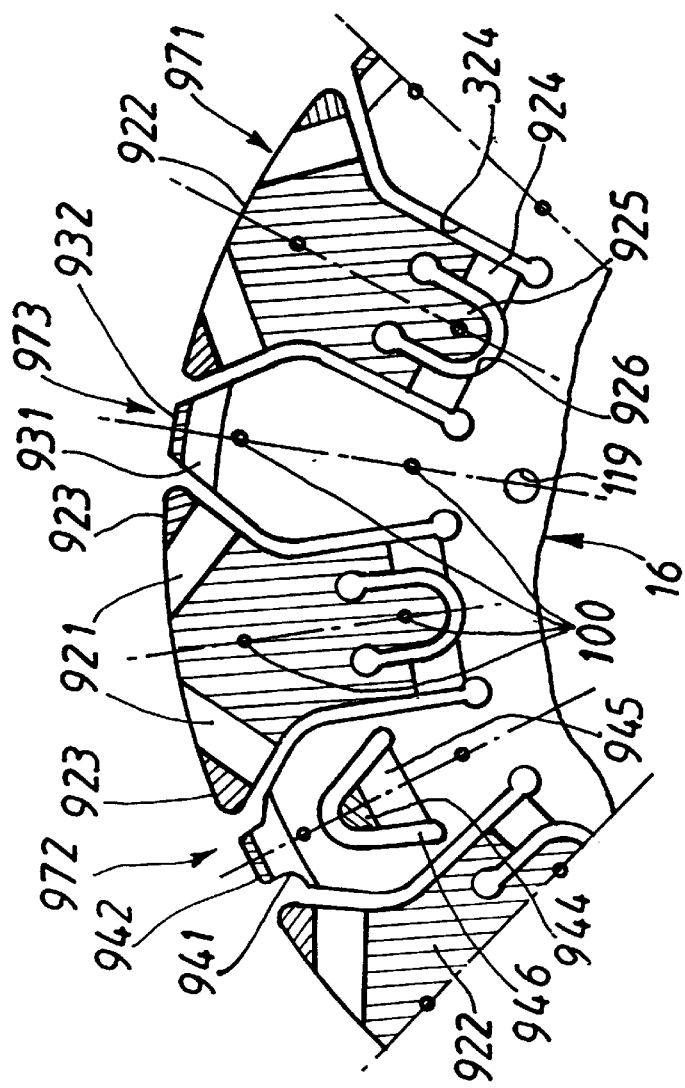
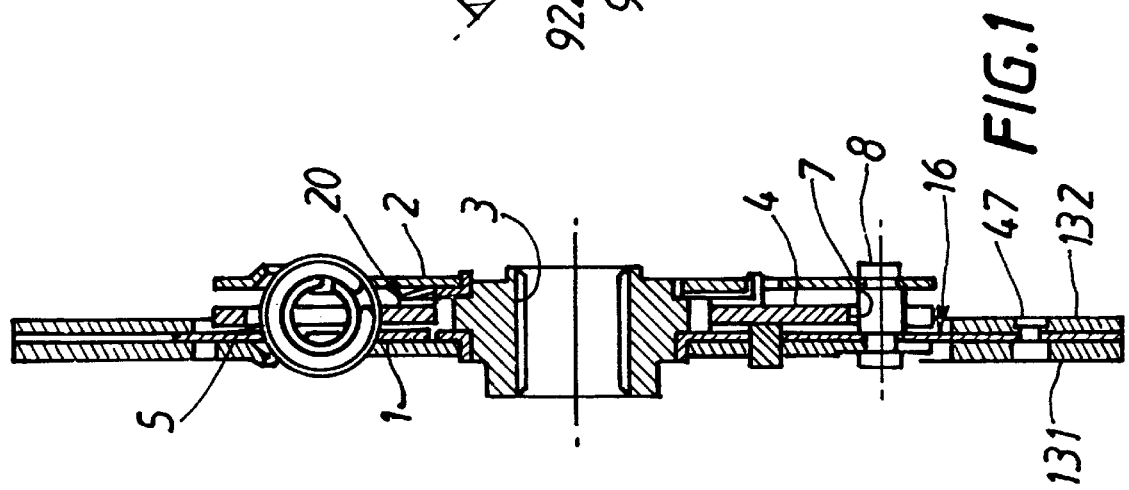

METHOD FOR FIXING FRICTION LININGS BY MEANS OF ADHESION TO A SUPPORT DISC

TECHNICAL FIELD OF THE INVENTION

The present invention concerns a method for fixing friction linings by means of adhesion to each side of a metal support disc, notably for a motor vehicle.

BACKGROUND OF THE INVENTION

In the document FR-A-2 164 139, hot-setting glue is applied to the metallic disc or to the friction linings, then the friction linings are placed in a press by mounting under pressure the said disc and the said friction linings between a stop and a counter-stop carried respectively by a top pressure plate and a bottom pressure plate forming part of the press and finally the said disc is heated using first heating means.

In practice, the heating means are induction heating means enabling rapid heating of the disc.

This process does not subject the friction material to a high heat.

As indicated in this document, the operation lasts only a few seconds.

The Applicant wondered whether it would be possible to further improve the control over the heating of the glue.

SUMMARY OF THE INVENTION

According to the invention, in a method of fixing friction linings by means of adhesion to each side of the metal support disc, notably for a clutch friction device of a motor vehicle, in which hot-setting glue is applied to the said metal disc or to the friction linings, then the friction linings are placed in a press by mounting the said disc and the said friction linings under pressure between a stop and a counter-stop carried respectively by a top pressure plate and a bottom pressure plate forming part of the press, and the said disc is heated using first heating means, the stop and counter-stop form part of second means of heating the friction linings and the metal support disc is heated more rapidly, using the first heating means, than the friction linings using the second heating means.

For example, the temperature reached by the first and second heating means can be the same but the second heating means are put into operation with a time shift (a time delay), for example of 30 seconds. In a variant, the support disc is heated more rapidly, its increase in temperature being more rapid than that of the friction linings.

Thus the glue sets before the friction linings expand.

In a variant, the temperature reached by the second heating means, for heating the friction linings, is lower than the temperature reached by the first heating means for heating the support disc. All this depends on the application and notably on the nature of the glue.

The difference in temperature being for example 400.

For example a glue of the thermosetting type is used. The heating time depends on the application and notably on the temperature reached by the heating means.

Thus, with a thermosetting glue, 1 hour at 1500 and 5 minutes at 2000 are required to achieve good control of the gluing process.

Thus, the friction linings also being heated in their entirety and not liable to be damaged by the temperature reached, the temperature between the two heating means is controlled well, so that the heating of the glue and the differential expansions between the linings and the disc are controlled well. Thereafter, the glued assembly may or may not be left to cool in the press.

It will be noted that there is no need to pre-heat the friction linings and that the temperature for heating the linings is naturally chosen so they are not degraded. The heating time is also chosen in order to prevent degradation of the said linings.

By virtue of this method it is possible to bond the friction linings to their associated disc using points of glue.

The points of glue are advantageously applied at the places where, formerly, it was customary to fix the friction linings onto the metal disc by riveting.

Thus, by virtue of the invention, it is possible, using a nozzle, to apply the glue horizontally to the disc or the linings at precise places.

According to another characteristic of the invention, the second heating means surround the first heating means, being of the annular type.

These second heating means can be equipped with channels to cool them.

Thus, during cooling, better control is obtained over the reduction in the temperature of the friction linings, which promotes good adhesion and makes it possible, notably, to minimise, as during the heating period, the bimetallic effects occurring between the friction linings and the support disc, owing to the fact that the friction linings are more thermally insulating than the disc.

The method according to the invention is particularly advantageous when the friction disc has tripod blades with large central support areas.

The application of the glue in points does not impair the good progressive action of the support disc.

BRIEF DESCRIPTION OF THE DRAWING

Other advantages will emerge in the light of the description which follows and with reference to the accompanying drawings, in which:

FIG. 1 is view in axial section of a clutch friction equipped with a support disc and two friction linings fixed by riveting to the said disc;

FIG. 2 is a partial view of the outer periphery of a support disc on which friction linings can be fixed by adhesion;

DESCRIPTION OF THE PREFERRED EMBODIMENT

Figure 3:
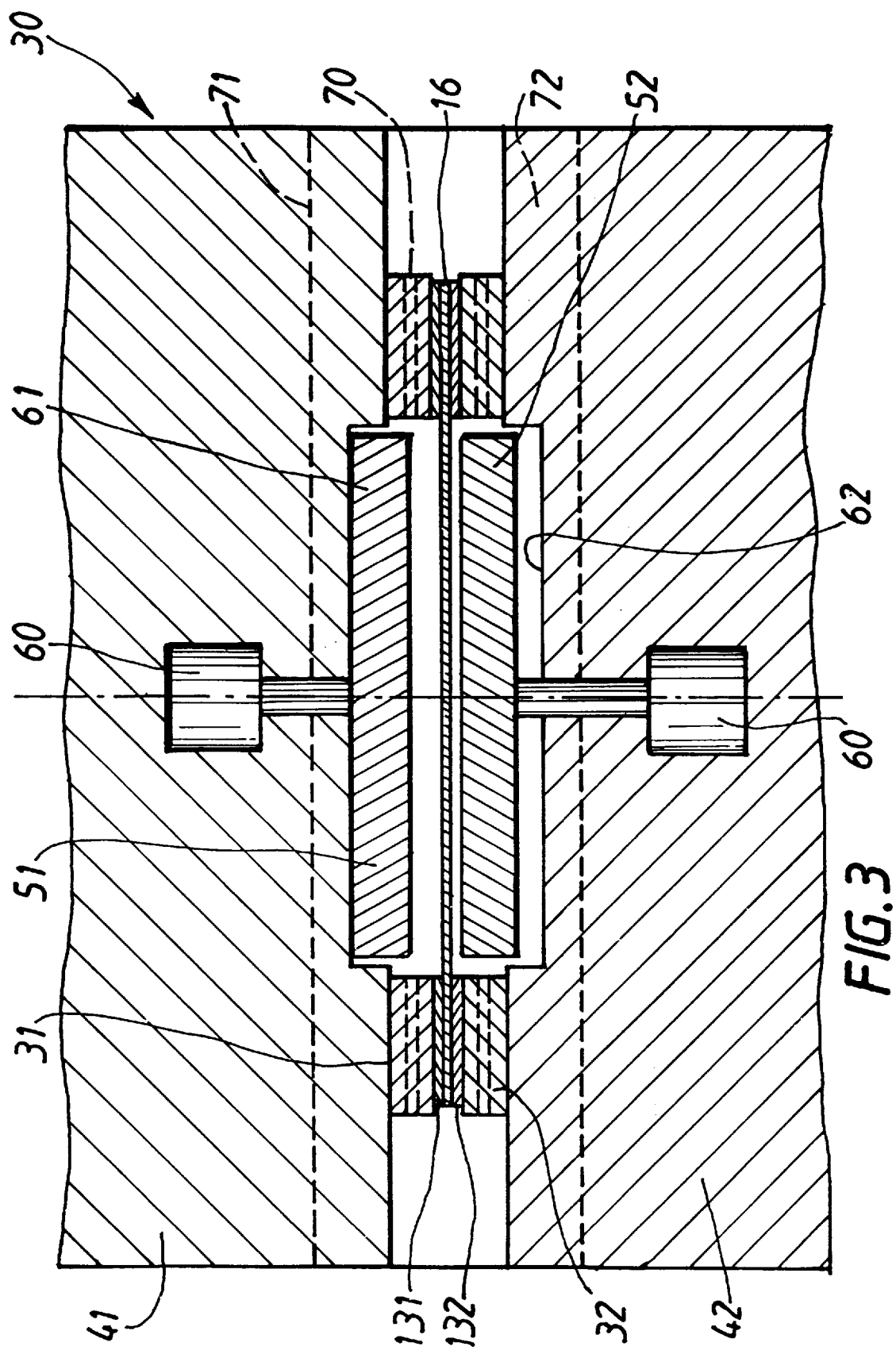
FIG. 3 is a schematic view of a press for applying a pressure and heating according to the method of the present invention.

In FIGS. 1 and 2 a clutch friction device and its support disc 16 have been depicted.

As is known, a clutch friction device has an input part 16, 131, 132 coupled to an output part 3.

The input part 16, 131, 132 is able to be gripped between the thrust and reaction plates of a clutch which are connected with respect to rotation, optionally in an elastic manner when the reaction plate is in two parts forming part of a damping flywheel, to a drive shaft (the end of the crankshaft in the case of an application in a motor vehicle), whilst the output part 3 usually consists of a plate fluted internally for its connection with respect to rotation to a driven shaft (the input shaft of the gearbox in the case of an application in a motor vehicle).

Normally, the clutch is engaged, the input element 16, 131, 132 being gripped between the thrust and reaction plates, so that the torque is transmitted from the drive shaft to the driven shaft.

In order to disengage the clutch it is necessary to act, using a clutch release bearing, on the end of the clutch release device of the clutch—usually a diaphragm—in order to make the gripping action stop and to release the input element 16, 131, 132.

The input element 16, 131, 132 can be coupled rigidly to the output element 3, being, for example, fixed by riveting onto a plate or flange joined to the hub 3.

In a variant, for a good filtration of vibrations, the input element is coupled elastically to the output element 3.

For example (FIG. 1) the input element 16, 131, 132 is joined to two guiding washers 1, 2 disposed on each side of a plate 4 fixed with respect to rotation, optionally after an angular clearance has been taken up with the intervention of meshing means with clearance, to the hub 3 forming the output element. Circumferentially acting springs 9 are housed in housings, most frequently apertures formed failing the guiding washers 1, 2 and in the plate 4. Axially acting elastic means 20 also intervene between the guiding washers 1, 2 and the plate 4.

Thus in a motor vehicle the clutch constitutes a cut-out and start-up component between the engine and the gearbox and makes it possible to filter the vibrations in the kinematic chain going from the engine shaft to the wheel shafts.

Another function is to ensure the comfort of the passengers by preventing any abruptness when the clutch is re-engaged.

Thus the input element 3, 132, 133 is of the progressive type, being elastic. In the "clutch disengaged" state the thickness of the said input element is greater than in the "clutch engaged" state.

In practice, this input element has a metal support disc 16 comprising a central part 16 and a peripheral part divided into elastic radial blades capable of receiving, for fixing, the friction linings 131, 132. The blades have areas axially offset with respect to the central part 16 and serving to fix the friction linings 131, 132.

This central part 16 is for example (FIG. 1) fixed to the guiding washers 1, 2 using small columns 8 connecting together, for fixing, the guiding washers 1, 2 and for this purpose passing through, with circumferential clearance, openings 7 in the plate 4.

In a variant the disc 16 is fixed to one of the guiding washers 1, 2 by dedicated rivets.

The fixing of the friction linings 131, 132 is usually effected with rivets 47. For more information, reference should be made for example to the document EP-A-0 579 554.

Thus, during the engagement of the clutch, the blades are progressively crushed. The drawback of fixing by riveting is an increase in thickness of the linings 131, 132 so that a sufficient thickness of material exists between the external face of the friction lining and the head of the rivets 47.

The result is an increase in the inertia of the clutch friction device.

For this reason it is advantageous to fix the friction linings on the support disc directly by adhesion.

The latter can have, for example, FIG. 2, on its outer periphery, alternating blades 971 and strips 972, 973 of radial orientation.

The blades 971 are of the tripod type and have a central support area 922 offset axially with respect to the central part 16 of the disc 16 and two peripheral support areas 923 disposed on each side of the central area 922, being offset axially with respect to the said central area.

Oblique folds 921, with respect to the radial axis of symmetry of the blade 971, connect the central area 922 to the peripheral support areas 923. A tangential fold 924, perpendicular to the radial axis of symmetry of the blade 971 connects the central area 922 to the central part of the disc 16 having holes 119 for its fixing by riveting to the guiding washer 1 of FIG. 1.

The surface area of the central area 922 is increased by virtue of the formation of a tongue 925 formed by a U-shaped slot 926 affecting the fold 924. The central area 922 serves to fix the friction lining 132 designed to come into contact with the thrust plate of the clutch.

The peripheral support areas 923 are capable of coming into contact with the other friction lining 131, in this case being in the same plane as the central part of the disc 16. The tongues 972, 973 have a main part in the same plane as the central part of the disc 16 and serve to fix the other lining 131 designed to come into contact with the reaction plate, being deformed less than the thrust plate under the effect of heat.

Slots separate the tongues 972, 973 from the blades 971.

The tongues having at least one supplementary support area 942, 932 offset axially with respect to their main part for contact with the other friction lining 132.

These areas 942, 932 are connected by means of tangential folds (perpendicular to the radial axis of symmetry of the tongues 972, 973) to the main part of the said flexible tongues.

In addition, it is possible to form a supplementary support area 944 directed axially towards the lining 132 by means of a slot 946 and a tangential fold.

Here it is therefore a matter of fixing the linings 132, 131 directly by adhesion respectively on the central support areas of the blades 971 and on the main part of the tongues 972, 973 of the metal support disc 16 in order to reduce the thickness of the friction linings and the inertia of the clutch friction device.

For this purpose, in a known manner, the said areas are pickled in order to promote the adhesion of the glue.

This pickling can be of a mechanical nature, for example with corundum, or of a chemical nature, for example immersion in an acid bath. Then the disc 16 and linings 131, 132 are mounted in a press 30 after having applied glue to the required areas of the disc and/or the linings 131, 132 in advance. This press has a top pressure plate 41 and a bottom pressure plate 42 mounted so as to move axially with respect to one another. The pressure plates 41, 42 have respectively a stop 31 and a counter-stop 32 for gripping the assembly formed by the friction lining 131, 132 and the metal support disc 16, sandwiched between the said linings. This stop 31 and this counter-stop 32 are provided with means for positioning the friction linings 131, 132.

This stop 31 or this counter-stop 32 can also be equipped with means for pre-positioning the disc 16.

In a variant, one of the pressure plates 41, 42 can be shaped in order to pre-position the said disc.

The glue is for example thermosetting, here of the phenolic type, and is capable of undergoing polymerisation. It thus adheres when hot.

More precisely, the method of fixing the friction linings 131, 132 by adhesion on each side of the metal support disc 16, notably for a clutch friction device of a motor vehicle, includes a step in which hot-setting glue is applied to the said metal disc or to the friction linings 131, 132, then a step in which the friction linings 131, 132 are placed in the press 30 by mounting the said disc and the said friction linings under pressure between the stop 31 and the counter-stop 32 carried respectively by the top pressure plate 41 and the bottom pressure plate 42 forming part of the press, and finally the said disc is heated using first heating means 51, 52.

This method is characterised in that the stop 31 and the counter-stop 32 form part of second heating means for heating the friction linings 131, 132 and in that the metal support disc 16 is heated more rapidly, using the first heating means 51, 52, than the friction linings 131, 132 using the second heating means 31, 32.

This heating operation, leading to a fixing by adhesion of the linings 131, 132 on the disc 16, has a duration, for example, of 5 minutes at 2000.

After this heating a cooling step is effected, still keeping the friction linings and the disc under pressure. In a variant, cooling is effected outside the press.

More precisely, by virtue of the invention, the glue is applied in points onto the central support areas 922 of the blades of the disc and on the main areas of the tongues 972, 973.

This application is effected using a nozzle and is carried out at the point 100 which formerly served for the fixing of the linings 131, 132 to the disc 16 by the rivets 47.

These points are very evident, and for this reason, reference should be made, for example, to the figures in the document EP-A-0 579 554.

Pressurising these points of glue 100 prevents the glue from reaching the folds 921, 941, 931, which, in this case, would impair the progressive action of the disc 16 and the effectiveness of the tongues notably in the supplementary support areas 942, 932.

During the step of applying pressure, the disc 16 is flattened because it is compressed between the stops 31 and 32 via the linings 131, 132.

The temperature reached by the support disc 16 can be, for example, 2000 and can be identical to that reached by the friction linings 131, 132. In a variant, the temperature reached by the friction linings 131, 132 can be lower than that reached by the support disc 16.

The duration of heating is explained notably by the fact that a certain time is necessary in order to increase the temperature of the friction linings 131, 132, which are thermally insulating. In addition, this makes it possible to achieve a better control over the progressive heating of the heating means.

The difference in the increase in temperature of the heating means makes it possible to achieve better control over the adhesion process so that the glue sets before the linings 131, 132 expand.

Heating can be effected, for example, by conduction.

The first heating means 51, 52 have heating plates 51, 52, here circular, carried respectively by the top pressure plate 41 and the bottom pressure plate 42. These heating plates 51, 52 are each subjected to the action of an actuator 60 enabling the said plates 51, 52 to come into contact with the top and bottom faces of the disc 16. The heating of the disc 16 can be effected by conduction. Each actuator 60 is carried by the pressure plate 41, 42 in question.

It can be seen that the second heating means 31, 32 consist here of pressure heating blocks, mounted fixedly on their associated pressure plates 41, 42. They surround the first heating means 51, 52, being of annular form.

Each plate 41, 42 is hollowed centrally at 61, 62, so that the plates 51 and 52 can move axially when the linings 131, 132 and the disc are gripped between the heating stop 31 and counter-stop 32.

The second heating means 31, 32 can be heated electrically just like the first heating means 51, 52 so that, as soon as the electric current is cut, heating is interrupted. The second heating means 31, 32 can act temporally with delayed action. In a variant the increase in temperature of the second heating means is less rapid than that of the first heating means.

Thereafter a cooling phase is entered, during which the linings 131, 132 and the disc 16 are for example always kept under pressure, here with the same pressure.

In practice the metal disc 16 cools more rapidly than the linings 131, 132.

The result is a differential cooling and a bimetallic effect.

To remedy this, provision is made for cooling the linings 131, 132 using the second heating means 31, 32. More precisely, the increase in temperature and cooling are effected gradually depending on the application.

These second heating means have, for example, inside them, channels 70 permitting rapid cooling of the linings 131, 132 through the circulation of a cooling fluid in the channels 70. The fluid can be of a gaseous or liquid nature After this operation, the plates 41, 42 are moved away from one another, actuators being provided in order to move at least one of the two plates, then the glued assembly formed by the disc 16 and linings 131, 132 is extracted, the disc 16 resuming its shape at rest in which the linings 131, 132 are distanced from one another. During this cooling operation the first heating means 51, 52 can be deactivated before the second 31, 32.

As will have been understood, by virtue of the invention, adhesion is controlled well and the temperature reached by the linings 131, 132 is such that they are not damaged. The duration of heating also means that the linings are not damaged.

In order to further improve control, provision is made for mounting the pressure stop 31 and counter-stop 32 on the thermally insulating plates 71, 72 fixed respectively to the top pressure plate 41 and bottom pressure plate 42.

By virtue of this arrangement, the heating means are isolated from the mass of the plates 41, 42, thus enabling adhesion to be controlled even more precisely.

Naturally, the present invention is not limited to the example embodiment described, in particular the tripod blades can have a different form, for example one of the forms described in the document EP-A-0 579 554, obviously taking account of the fact that the holes for the passage of the rivets form points where gluing will be effected, the said holes being omitted. Thus the blades can all be of the tripod type and, in FIG. 2, it is only by way of example that two different types of tongue 972, 973 have been depicted, the disc 16 generally being equipped with only one type of strip.

By virtue of the gluing, in the aforementioned manner, the thickness of the friction linings 131, 132 can be reduced.

Naturally, the invention can be applied to any type of progressive support disc, the blades not having to be of the tripod type. It is possible a to vary the pressure between the heating and cooling operations.

Figure 4:
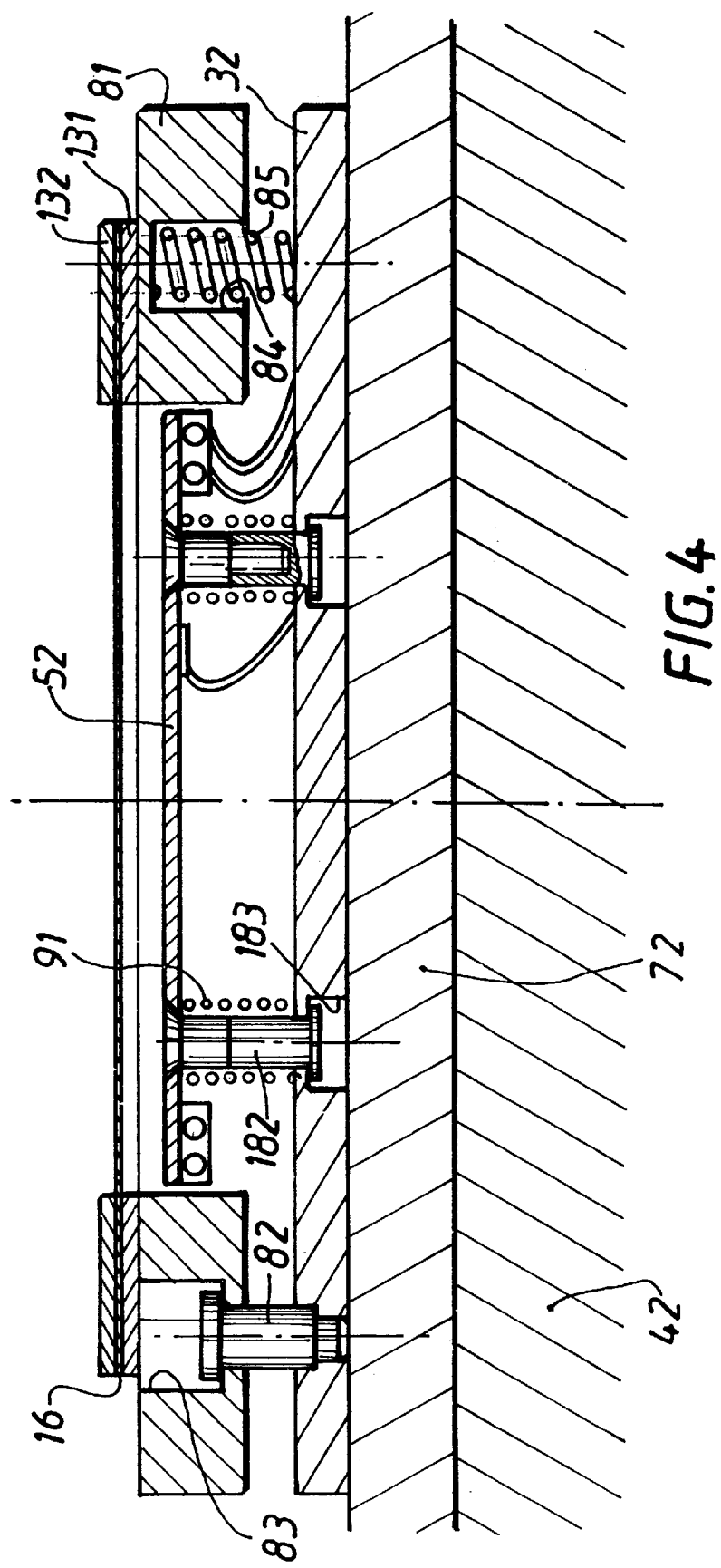
FIG. 4 is a half view similar to FIG. 3 for another example embodiment.

The heating means can be arranged in a different manner, notably at the level of the lower part of the press, as can be seen in FIG. 4. In this figure an axially movable plate 81 is associated with the counter-stop 32 consisting of an electrically heating plate and extending below the bottom part 52 of the first heating means 51, 52. The plate 81 is axially movable by virtue of small columns 82 screwed into the plate 32 powered electrically in order to heat the lining 131 via the thermally conductive plate 81, here metallic.

The heads of the small columns 82 are mounted in countersinks 83 in the plate 81 serving to support the friction lining 131.

The plate 81 also has blind holes 84 for mounting return springs 85, here coil springs, bearing against the heating plate 32 and the bottom of the blind hole 84. The springs 85 and the small columns 82 are distributed regularly and alternately around the circumference.

The first heating means 51, 52 have a heating plate 52 powered electrically and axially movable by means of small columns 182 and return springs 91 in the same way as the plate 81. More precisely, the small columns 182 have a head mounted in a countersink 183 in the plate 32 and a flared foot for fixing the small column 183 to the plate 52, here slim in order to permit rapid heating of the disc 16. The plate 52 is powered electrically.

The plate 81, thicker than the plate 52, surrounds the said plate 52.

As will have been understood, the small columns 82, 182 are mounted in reverse orientations, the heads of the small columns 82, 182 limiting the axial movement respectively of the plate 81 and of the plate 52 by cooperating with the base of the countersinks 83, 183. As will have been understood, the plate 81 lifts the friction linings 131, 132 and the support disc 16 as soon as the press is opened. Thermal conduction is thus broken between the linings 131, 132 and the second heating means proper 31, 32 and between the disc 16 and the first heating means 51, 52, the axial movement of the plate 52 being smaller than that of the plate 81.

As in FIG. 2, a thermally insulating plate 72 is associated with the plate 32 in order to insulate the lower part of the press.

As will have been understood, it is possible to control the increase in temperature of each heating means by varying for example the intensity of the electric current. The materials from which the heating means are made can be different. The thickness of the heating means can be altered. Numerous parameters thus make it possible to heat the support disc more rapidly.

What we claim is:

1. A method of fixing linings by means of adhesion to each side of the metal support disc, notably for a clutch friction device of a motor vehicle, in which hot-setting glue is applied to the metal disc or to the friction linings, then the friction linings are placed in a press by mounting the disc and the friction linings under pressure between a stop and a counter-stop carried respectively by a top pressure plate and a bottom pressure plate forming part of the press, and the disc is heated using first heating means, the stop and the counter-stop forming part of a second means for heating the friction linings and the metal support disc being heated more rapidly, using the first heating means, than the friction linings using the second heating means.

2. The method of claim 1, wherein the second heating means surround the first heating means.

3. The method of claim 1, wherein the second heating means are provided with cooling means.

4. The method of claim 3, wherein the cooling means consist of channels permitting the passage of cooling fluid.

5. The method of claim 1, wherein the second heating means are of an electrical nature.

6. The method of claim 1, wherein the first heating means have heating plates carried, so as to move axially, respectively by the top pressure plate and the bottom pressure plate.

7. The method of claim 6, wherein the plates are mounted so as to be moved by means of actuators.

8. The method of claim 7, wherein the bottom and top pressure plates are hollowed for mounting the first heating means.

9. The method of claim 1, wherein the first heating means and the second heating means are mounted on their respective pressure plates by means of thermally insulating plates.

10. The method of claim 3, wherein an axially movable plate is associated with the second heating means.

11. The method of claim 10, wherein the second heating means have a second plate extending below a first plate forming part of the first heating means.

12. The method of claim 11, wherein the plate and the said first plate are mounted so as to move axially with the aid of small columns associated with the second plate against the return springs.

13. The method of claim 1, wherein the second heating means act in a time-delayed manner.

14. The method of claim 1, wherein the increase in temperature of the second heating means is less rapid that of the first heating means.

* * * * *